(12) United States Patent
Lai et al.

(10) Patent No.: US 6,175,643 B1
(45) Date of Patent: Jan. 16, 2001

(54) NEURAL NETWORK BASED AUTO-WINDOWING SYSTEM FOR MR IMAGES

(75) Inventors: Shang-Hong Lai, Plainsboro; Ming Fang, Cranbury, both of NJ (US)

(73) Assignee: Siemens Corporate Research, Inc., Princeton, NJ (US)

( * ) Notice: Under 35 U.S.C. 154(b), the term of this patent shall be extended for 0 days.

(21) Appl. No.: 08/993,230

(22) Filed: Dec. 18, 1997

(51) Int. Cl.$^7$ ................................ G06K 9/00; G06K 9/62
(52) U.S. Cl. ............................................. 382/131; 382/156
(58) Field of Search .................................... 382/156, 157, 382/158, 159, 128, 131

(56) References Cited

U.S. PATENT DOCUMENTS 5,305,204  *  4/1994  Ohhashi .......................... 364/413.13
5,995,644  *  12/1999  Lai et al. .............................. 382/131

OTHER PUBLICATIONS

Ohhashi et al. "Application of a Neural Network to Automatic Gray–level Adjustment for Medical Images." IEEE International Joint Conference on Neural Networks, IJCNN '91. Cat No. 91CH3065–0. pp. 974–980, Nov. 1991.*

* cited by examiner

Primary Examiner—Bhavesh Mehta
(74) Attorney, Agent, or Firm—Donald B. Paschburg

(57) ABSTRACT

An adaptive hierarchical neural network based system with online adaptation capabilities has been developed to automatically adjust the display window width and center for MR images. Our windowing system possesses the online training capabilities that make the adaptation of the optimal display parameters to personal preference as well as different viewing conditions possible. The online adaptation capabilities are primarily due to the use of the hierarchical neural networks and the development of a new width/center mapping system. The large training image set is hierarchically organized for efficient user interaction and effective re-mapping of the width/center settings in the training data set. The width/center values are modified in the training data through a width/center mapping function, which is estimated from the new width/center values of some representative images adjusted by the user. The width/center mapping process consists of a global spline mapping for the entire training images as well as a first-order polynomial sequence mapping for the image sequences selected in the user's new adjustment procedure.

11 Claims, 7 Drawing Sheets

NEURAL NETWORK BASED AUTO-WINDOWING SYSTEM FOR MR IMAGES

BACKGROUND OF THE INVENTION

1. Field of the Invention

The present invention relates to Magnetic Resonance (MR) image displays, and more particularly, to an auto-windowing system for MR images capable of adapting to optimal display parameters, personal preferences and different viewing conditions while online.

2. Prior Art

Adaptive and automatic adjustment of the display window parameters for Magnetic Resonance (MR) images under different viewing conditions is a very difficult and challenging problem in medical image perception. There are several factors that make this problem difficult, namely, the function describing a human expert's adjustment of display window parameters for a wide variety of MR images is extremely complicated, the adjustment result is subjective and substantially depends on personal preference, the adjustment function varies with the viewing conditions, etc. The viewing conditions are generally the condition of the monitor and the exterior viewing environment, such as the illumination condition. It is almost impossible to account for all these issues in a single universal algorithm.

The display windowing process is primarily used in the mapping of 12-bit MR image intensity values into 8-bit gray levels for displaying MR images on a common 8-bit computer monitor. The display window consists of a width parameter and a center parameter. The windowing process maps the image intensity values linearly from [center-width/2, center+width/2] to the nearest integer in [0,255]. For the MR image intensity values below (center-width/2), they are mapped to 0. Similarly, the image intensity values greater than (center+width/2) are mapped to 255. Apparently, these two parameters can greatly influence the appearance of the image to be displayed. In other words, the brightness and the contrast of an image is determined by these two parameters. Inadequate adjustment of these parameters can lead to degradation of image quality, and in severe cases to loss of valuable diagnostic information of the images.

Most previous methods for the adjustment of display window parameters are either very restricted to certain types of MR images or perform very differently from the human adjustment. R. E. Wendt III, "Automatic adjustment of contrast and brightness of magnetic resonance images", *Journal of Digital Imaging*, Vol. 7m No. 2, pp 95–97, 1994. Wendt III has proposed a method which first determines the type of an MR image by reading the image header information, and then computes the display parameters depending on the type of the image. Unfortunately, different rules must be set for different types and orientations of MR images in this method. This makes the algorithm impractical, since new rules need to be added in the program to reflect any new changes in the MR image acquisition process, such as, for example, the use of new coils or new pulse sequences. Ohhashi et al. has developed a neural network based method for the automatic adjustment of the display window. A. Ohhashi, S. Yamada, K Haruki, H. Hatano, Y Fujii, K Yamaguchi and H Ogata, "Automatic adjustment of display window for MR images using a neural network", *Proceeding of SPIE*, Vol. 1444, *Omage Capture, Formatting and Display*, pp. 63–74, 1991. This method is still a pure histogram based method, and as such, there is a potential problem of very different adjustments for images with very different spatial distributions but very similar histograms. In addition, this method only uses a single neural network for approximating the human adjustment, which is too complicated for a wide range of MR images to be sufficiently approximated with good generalization power by a single neural network.

Recently, the inventors proposed a comprehensive hierarchical neural networks (HNN) based algorithm for automatic and robust adjustment of the display window, which is the subject of U.S. patent application Ser. No. 08/885,080 entitled "Robust and Automatic Adjustment of Display Window Width and Center for MR Images" filed on Jun. 30, 1997, now U.S. Pat. No. 5,995,644, the entire disclosure of which is incorporated herein by reference. This algorithm is based on the principle of learning from examples, (i.e. a large set of MR images associated with the window width/center values adjusted by human experts). This HNN based algorithm uses both wavelet histogram features and spatial statistical information of MR images for feature generation, which overcomes the problem of using pure histogram information only. A hierarchical neural network was developed to decompose the very complicated function approximation problem into several simple subproblems. The hierarchical neural Rtworks are comprised of a modified competitive layer neural network for clustering any input image into a certain number of clusters, and the Radial Basis Function (RBF) and the Bi-modal Linear Estimation (BLE) networks for each class to provide good estimation results. Finally, a data fusion step is used to intelligently combine the multiple estimates from the RBF and BLE networks to provide accurate and robust estimation results.

All the above methods lack the capabilities of adapting the window width/center adjustment to different personal preferences or different viewing conditions as described above. The automatic display window width and center adjustment by using all the previous methods can only be optimized for a particular personal taste and for a particular viewing condition. The demand for an adaptive and automatic windowing system is very common since the automatic windowing system needs to be used by many persons with different personal preferences and in different viewing conditions.

SUMMARY OF THE INVENTION

The present invention is based on the inventors previously described HNN based display window width/center estimation algorithm, the entire disclosure of which is incorporated herein by reference. Due to the basic learning-from-examples principle of the HNN algorithm, the training data set is organized into categories as well as sequences with some representative images selected from each sequence. By re-adjusting some representative images of the sequences in some categories selected by the user, the width/center values of the entire training data are mapped through a global mapping function and a sequence mapping process to adapt the width/center settings of the training data set to the user's preference and the viewing conditions. The global mapping function used is a linear spline function that is obtained by fitting the data of all the re-adjusted representative images. This is used to capture the general personal preference and account for the effect of the viewing condition. The sequence mapping process involves fitting the baseline width/center values in a sequence with low-order polynomial functions and setting the new width/center values in one sequence with the new baseline polynomial function. The sequence mapping is applied after the global mapping and only to the sequence with representative frames selected by the user for re-adjustment. After the above mapping process, the hierarchical neural networks are re-trained with the new training data, thus the re-trained HNN algorithm is adapted to the user's personal preference as well as the viewing condition.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Figure 1:
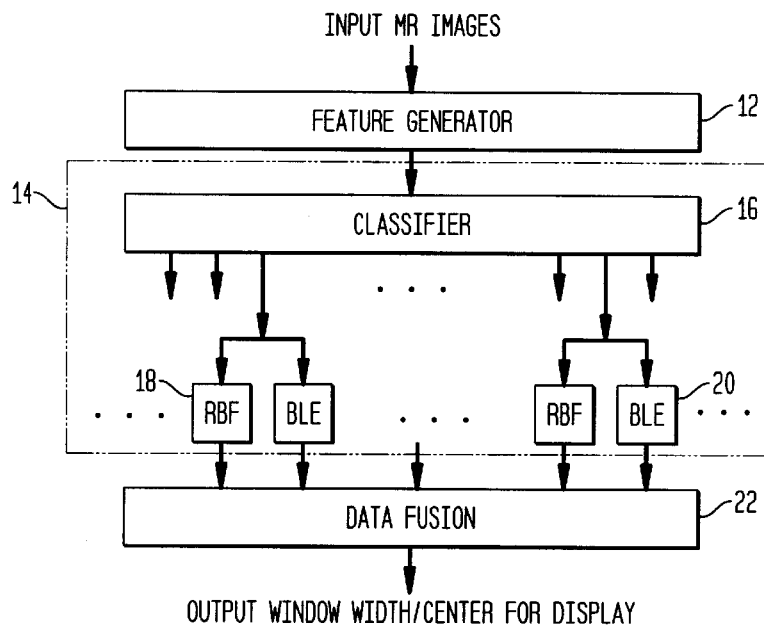
FIG. 1 is a flow chart of the hierarchical neural network (HNN) algorithm for the adjustment of a display window according to the prior art.

Referring to FIG. 1, in the HNN algorithm of the prior art, the feature generator 12 extracts two types of features from MR images as the input to the HNN, namely, the wavelet histogram feares and spatial statistical features. The selection of these features resolves in most cases the conflicting situations where the display window settings are very different although the histograms of the images are very similar. The wavelet transform is used to compress the histogram information into a much smaller size for efficient training of neural networks. For distinguishing different types of MR images, a neural network based clustering algorithm 14 is employed to cluster any input image into multiple clusters. The neural network based clustering algorithm 14 uses two totally different and independent estimation methods in each class to achieve good estimation performance. Once the input images are classified by classifier 16, radial basis function (RBF) networks 18 are used for accurate estimation for known (trained) MR images, while bimodal linear (BLE) networks 20 provide robust and reasonable estimation for a wide range of images, that may not be included in the training data'set.

The use of hierarchical neural networks significantly simplifies the approximation of the complicated display window adjustment function by decomposing a large and complex problem into a number of small and simple sub-problems. The last step in the HNN algorithm is a data fusion process 22 that intelligently combines the multiple estimates supplied by the RBF and BLE networks in the assigned clusters based on a consistency measure.

Hierarchy of the Training Data

The HNN algorithm is based on learning from examples. The training data set consists of a very large number (i.e., thousands) of feature vectors extracted from the MR images along with the associated width/center values adjusted by human experts. It is not necessary to store the original MR images in the training data, since only the compact feature vectors and the width/center values are required in the training of the HNN. This overcomes the problem of saving and transmitting an enormous amount of training image data. The online training system of the present invention changes the existing window width/center values in the training data to adapt to the personal preference and viewing environment through some user interaction. The user interaction involves the re-adjustment of the window width/center for some representative images in the training data set. It is impractical and unnecessary for the user to re-adjust a very large number of MR images in the training data set. Thus, the representative images are used to simplify the user interaction process and make the mapping of the re-adjustment to the entire data set effective. According to an embodiment of the invention, the representative images are selected based on a hierarchical organization of the entire training data. This hierarchical organization facilitates efficient user interaction as well as effective mapping of the training data according to the new re-adjustments by the user for adaptive online training.

Figure 2:
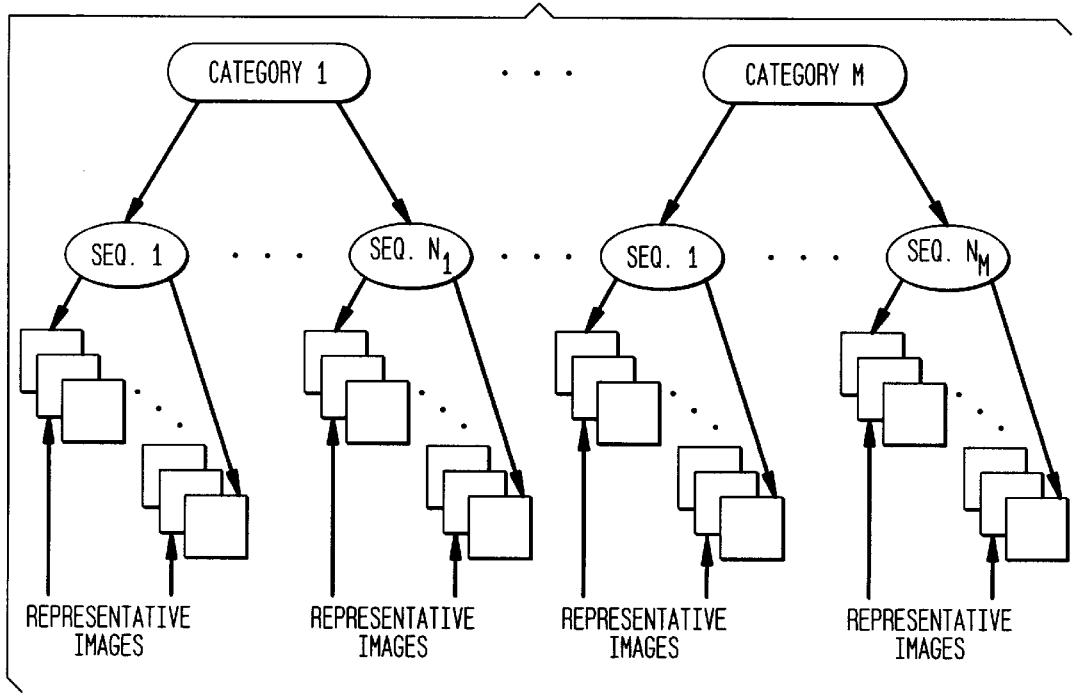
FIG. 2 is a schematic representation of the hierarchy of the training data organization according to an embodiment of the invention.

The hierarchy of the training data organization is shown in FIG. 2. The entire training images are first classified into a few major categories according to the types and studies of MR images. For example, the MR images in our training data set are categorized into head, body, heart, spine, neck, periphery, angiography and miscellaneous categories. Other implementations can use different categories without departing from the scope of this disclosure. This categorization depends on the training image set, and allows additions of new categories or deletions of existing categories based on the changes in the training data set. By carefully examining the training images of each category, the MR images can be grouped into the same sequence together with an appropriate order and assign a category to each sequence. For example, the MR images in category 1 are grouped into sequences Seq1–Seq $N_1$. Thus, there are many MR sequences in each category in an organized order. Representative frames are then selected in each sequence for the user re-adjustment. In the present implementation, two or three representative frames are selected, however, any suitable number of representative frames can be selected for the desired application. The representative frames should be chosen such that their locations in their sequence are well separated. For example, one can choose the representative frames separately from the beginning portion, the ending portion, and the middle portion of a sequence.

In addition to the feature vectors and the width/center values of all the training images, the online training data set needs to store all the representative images for the user re-adjustment. The number of representative images in each sequence should be as small as possible for saving the storage space for the online training data as well as making the user interaction efficient. Note that it is not required for the user to go through all the representative images in the online training set. The user can simply select a few sequences in some categories of interest to re-adjust the display window width/center of the corresponding representative frames.

Mapping of Width/Center Settings

Two types of the width/center mapping have been developed for modifying the training data from the user's re-adjustment of some representative images to adapt the HNN algorithm to the personal preference and viewing environment. The first type is a global mapping process which is applied to the entire data set to account for the general personal preference and the viewing condition. The other is a sequence mapping procedure that is only limited to each individual sequence with representative frames being re-adjusted by the user. The sequence mapping is used to enforce the change of the width/center setting for the sequence according to the user's new adjustment. The details of these two types of mapping are addressed subsequently.

Global Mapping

The global mapping function is a transformation of the original width/center values to the new width/center values. The global mapping transformation is denoted by $f(w, c)$ with $f(w, c)=f_w(w)w, f_c(c)c)$, where w and c are the original width and center values, and $f_w(w)$ and $f_c(c)$ are the scaling factors for generating new width/center values, respectively. Each of the functions $f_w$ and $f_c$ are represented by a spline function with non-uniform nodes. The spline function is a piecewise polynomial with some continuity conditions, which is constituted by several polynomials with each polynomial assigned to an interval determined by two neighboring nodes. Assume there are n nodes, $x_i$, for $i=1, \ldots, n$, chosen in order between 0 and 4095, i.e. $0 < x_1 < x_2 < \ldots < x_n < 4095$, and two fixed nodes $x_0 = 0$ and $x_{n+1} = 4095$ for the spline. A spline function $f(x)$ can be written as $$\sum_{i=0}^{n} P_i(x)$$

where each $P_i(x)$ is a polynomial inside the interval $[x_i, x_{i+1}]$ and is zero outside the interval. The spline can usually be represented by the values of the function and the necessary function derivatives at the nodal points. The present invention uses the linear spline for the global mapping function. The linear spline function can be simply defined from the nodal values $f_i$, $i=1, \ldots, n$, with the boundary condition $f(x_0)=f_0$ and $f(x_{n+1})=f_{n+1}$ as follows $$f(x) = f_0 B_0(x) + \sum_{i=1}^{n} f_i B_i(x) + f_{n+1} B_{n+1}(x)$$

where $B_i(x)$ are the basis functions that are nonzero in a small interval determined by the nodal locations. Note that the first and the last terms are from the boundary condition. These basis functions are defined as follows:

For $B_0(x)$, $$B_0(x) = \frac{x - x_1}{x_0 - x_1} \quad x_0 \leq x < x_1$$

For $B_i(x)$, $i=1, \ldots, n$ $$B_i(x) = \frac{x - x_1}{x_i - x_{i-1}} \quad x_{i-1} \leq x < x_i$$

$$B_i(x) = \frac{x - x_{i+1}}{x_i - x_{i+1}} \quad x_i \leq x < x_{i+1}$$

$B_i(x)=0$ elsewhere

For $B_{n+1}(x)$, $$B_{n+1}(x) = \frac{x - x_n}{x_{n+1} - x_n} \quad x_n \leq x \leq x_{n+1}$$

After introducing the linear spline model for the global mapping function, we now describe how we fit the linear spline functions to the re-adjustment data. Let the data points from the re-adjustment of N selected representative images be given by $(a_k, b_k)$, $k=1, \ldots N$, where $a_k$ is the original width or center value, and $b_k$ is the ratio of the re-adjusted width or center value to the original value $a_k$. The boundary condition is $f_0=f_{n+1}=1$. The linear spline fitting problem is to find the unknown nodal values, $f_1, \ldots, f_n$, such that the fitting errors between the spline and the data points are minimized. In addition, we can impose a smoothness constraint on the spline to achieve robust fitting. Thus, the linear spline fitting can be accomplished by minimizing the energy function $E(f_1, \ldots f_n)$ defined as follows $$\sum_{k=1}^{N} \left( b_k - f_0 B_0(a_k) - \sum_{i=1}^{n} f_i B_i(a_k) - f_{n+1} B_{n+1}(a_k) \right)^2 + \lambda \sum_{i=1}^{n+1} (f_i - f_{i-1})^2$$

where $\lambda$ is a regularization parameter that controls the smoothness of the spline. This parameter has been set to 1.0 in our implementation. The energy function $E(f_1, \ldots, f_n)$ consists of the data compatibility energy in the first summation and the smoothness energy in the second summation. This energy function is a quadratic and convex function of the coefficient vector $u=(f_1, \ldots, f_n)^T$. The solution to this least square problem can be obtained by solving the system $Au=y$, where A is an n×n matrix and y is an n×1 vector, which is derived from the energy function $E(u)$. To be more specific, the (i,j)-th entry in the matrix A can be written as $$A_{ij} = \sum_{k=1}^{N} B_i(a_k) B_j(a_k) + 2\lambda \delta(i - j) - \lambda \delta(i - j + 1) - \lambda \delta(i - j - 1)$$

where $\delta(i)$ is the delta function that takes the value 1 when $i=0$ and the value 0 elsewhere. The i-th entry of the vector y is given by $$y_i = \sum_{k=1}^{N} B_i(a_k)(b_k - f_0 B_0(a_k) - f_{n+1} B_{n+1}(a_k)) +$$

$$\lambda f_0 \delta(i) - \lambda f_{n+1} \delta(i - n - 1)$$

Note that the matrix A is a tridiagonal and symmetric positive defmnite (SPD) matrix. (See. G. H. Golub and C. F. Van Loan, *Matrix Computations*, $2^{nd}$ Edition, The Johns Hopkins University Press, 1989). This linear system can be solved simply by Gaussian elimination. After applying the above linear spline fitting procedure to obtain both the width and center global mapping functions, the width/center global mapping transforms are applied to all the original width/center values in the training data set to generate the new width/center settings for the new training data set. Thus the retrained HNN algorithm is accommodated to the user's general personal preference and the environments viewing condition.

Figure 3A:
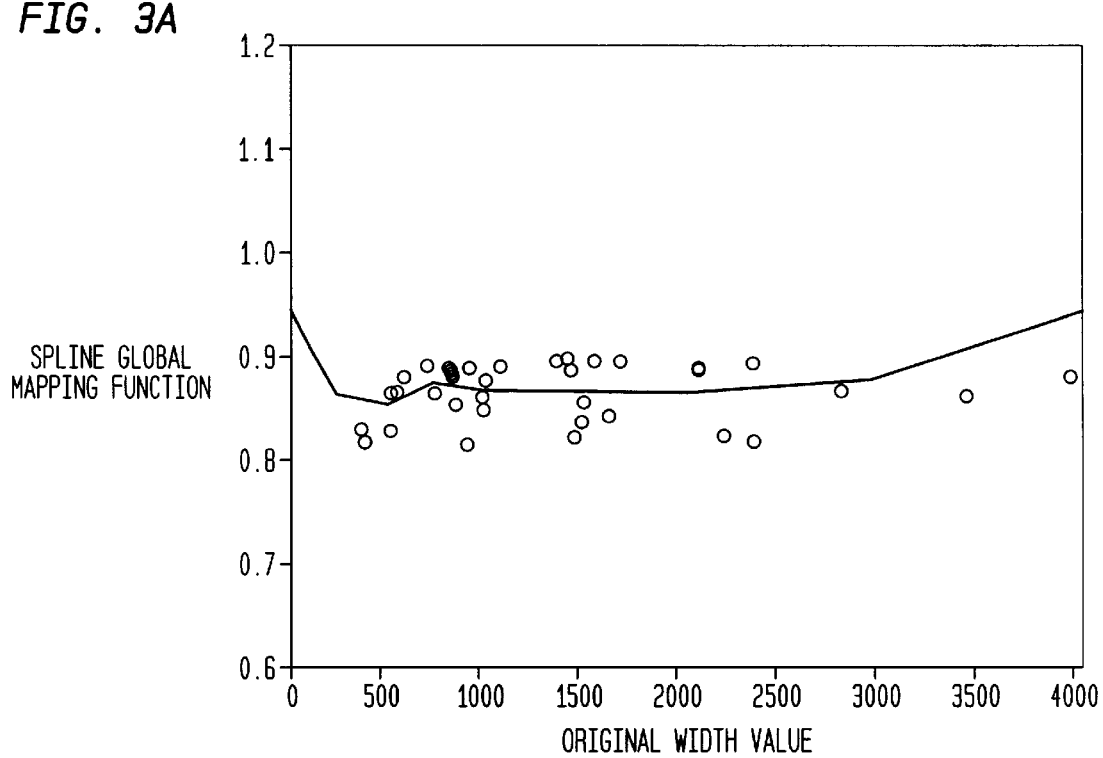
FIG. 3a is a graphical representation of an example of the global spline mapping function for width according to an embodiment of the present invention.
Figure 3B:
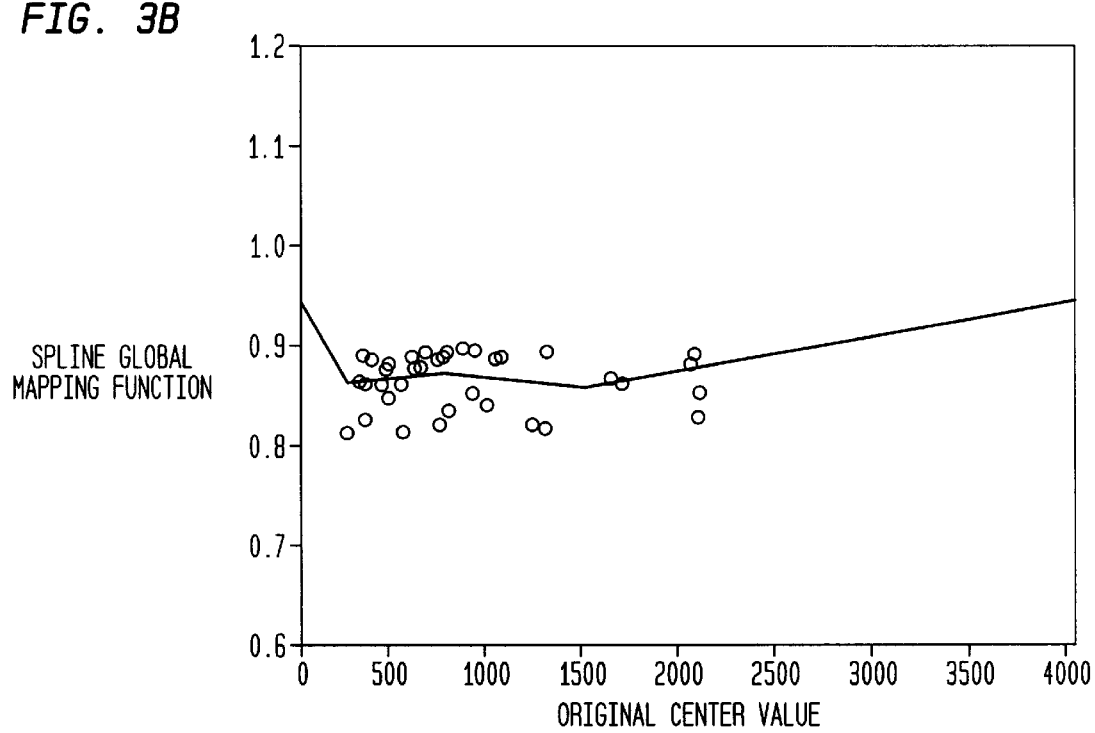
FIG. 3b is a graphical representation of an example of the global spline mapping function for center according to an embodiment of the present invention.

FIGS. 3a and 3b show an example of the global spline mapping function computed by fitting a linear spline to the user re-adjustment data separately for width and center, respectively. The circles in the figure represent the data points.

Sequence Mapping

Unlike the global mapping that is applied to the entire training data set, the sequence mapping is only applied to each individual sequence that contains representative frames re-adjusted by the user. The sequence mapping function is performed after the global mapping process. The sequence mapping is used to enforce the new width/center settings of all the images in the same sequence to comply to the user's re-adjustments. The idea behind the sequence mapping procedure is to use a baseline curve to represent very general width or center settings in an ordered sequence. This baseline curve is a function of the image index in a sequence, and is obtained by fitting a low-order polynomial, usually up to first order, to the width or center values at locations of the representative frames. The procedure involves fitting the baseline polynomials to the width/center values of the representative frames from the user re-adjustment and to those after the global mapping process. Then, the new baseline curve is enforced by adding the difference between these two baseline curves at the corresponding image index to the width/center value of each image in the sequence. The details of this procedure are now described.

Let the ordered images in a sequence be indexed from 1 to m and the associated width/center values obtained after the global mapping process be denoted by $w_i/c_i$ for i=1, . . . , m. The re-adjusted representative frames in the same sequence are indexed by $r_j$ with $1 \leq r_j \leq m$ for j=1, . . . , m' and the associated re-adjusted width/center values are denoted by $w_j'/c_j'$, where m' is the number of representative frames in the sequence selected in the re-adjustment. Two baseline curves represented by low-order polynomials $p_w(i)$ (or $p_c(i)$) and $p_c'(i)$ (or $p_c'(i)$) are fitted to the width (or center) values of the representative frames obtained after the global mapping and re-adjusted by the user, respectively. To enforce the baseline curve to the width/center setting from the user's re-adjustments, we perform the following sequence mapping to all the width/center values in this sequence to generate the new training data, $$(w_i, c_i) \rightarrow (w_i + p_w'(i) - p_w(i), c_i + p_c'(i) - p_c(i))$$

Note that this sequence mapping procedure is only performed for the sequence with its representative frames being selected in the user re-adjustment process. The order of the polynomials used in the baseline curve fitting depends on the number of re-adjusted frames in this sequence and is generally less than 1. More complex computations for higher orders of polynomials can also be employed.

Figure 4A:
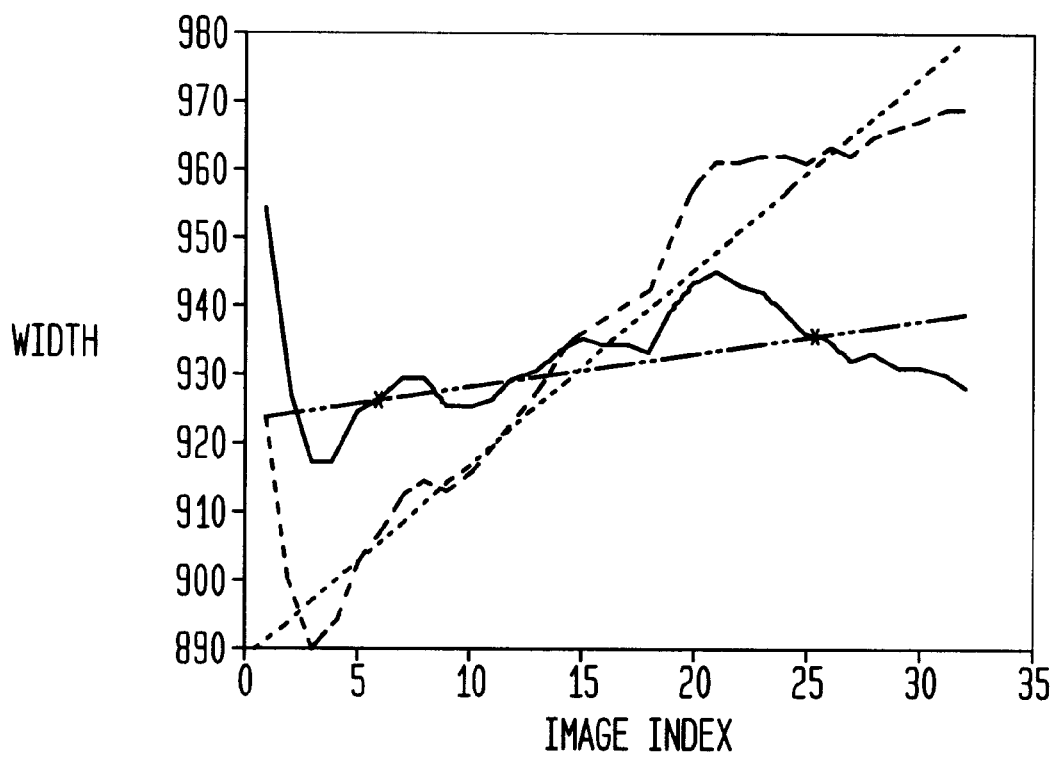
FIG. 4a is graphical representation of the width setting curves in an MR sequence after the global mapping process and sequence mapping procedure in accordance with an embodiment of the invention.
Figure 4B:
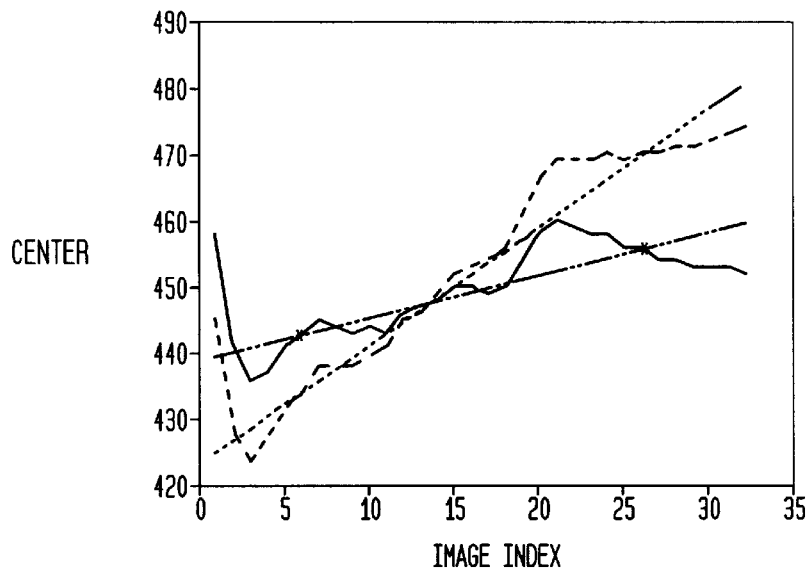
FIG. 4b is graphical representation of the center setting curves in an MR sequence after the global mapping process and sequence mapping procedure in accordance with an embodiment of the invention.

Examples of an MR sequence with its width/center settings after the global mapping process and the sequence mapping procedure described in this section are shown in FIGS. 4a and 4b. In the examples, two representative frames are selected for the user re-adjustment. Their re-adjusted width/center values are marked using a star (*) in the figures. The sequence mapping enforces the baseline of the new width/center settings in the sequence using the user's re-adjusted values of the representative frames in the sequence.

Training of the Hierarchical Neural Networks

In this section, we briefly discuss the training of the hierarchical neural networks [Lai&Fang, 1997] used in our system. As shown in FIG. 1, the hierarchical neural networks consist of a modified competitive-layer-neural network for clustering, a number of RBF networks and BLE networks for window width/center estimation. In the training of the HNN, we first train the modified competitive layer neural network. Then, the entire training data set is clustered into different classes through the trained modified competitive layer neural network. For each class, the associated RBF and BLE networks are trained using the training data assigned to this class. Each training component in the HNN is described below.

Modified Competitive Layer NN

Figure 5:
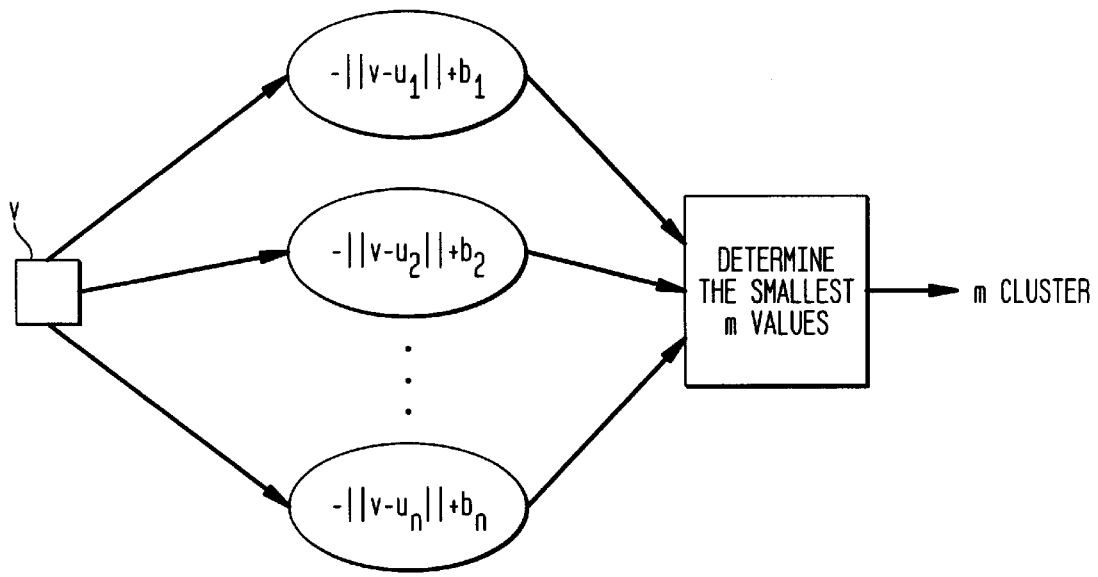
FIG. 5 is a block diagram of the structure of the modified competitive layer neural network for soft clustering according to an embodiment of the present invention.

The training of the modified competitive layer neural network is an unsupervised learning process. As illustrated in FIG. 5, the network contains n classes with each class represented by a centroid vector u, and a bias b, where $1 < i < n$ and i is the index for the class. The main difference between the modified competitive layer NN and the standard one (see, T. Kohonen, *Self-Organization and Associative Memory*, $2^{nd}$ Edition, Springer-Verlag, Berlin, 1987) is that the former assigns m ($1 \leq m \leq n$) classes for each input vector while the latter assigns only one class for each input vector. In invention uses a modified version of the Kohonen's learning rule to train this network. The modification is according to the use of soft clustering. The training procedure is listed below.

1. Randomly initialize the centroid vectors $u_i$ according to the sample mean and variance of the entire training data set; set the running averages $z_i$ to 1/n and the biases $b_i$ to $c/z_i$, where the constant c is set to 0.0054, and set k=0.

2. Randomly select a input vector from the training data set and increment k by 1.

3. Compute the values $-\|v - u_i\| + b_i$ for $1 \leq i \leq n$ and select the m classes with the smallest values as the output. Note that the symbol $\|\|$ denotes the Euclidean distance.

4. Update the centroid vectors, the running averages and the biases of all the assigned classes computed in the previous step as follows:

$$u_i^{(new)} = u_i^{(old)} + \mu(v - u^{(old)})$$

$$z_i^{(new)} = z_i^{(old)} \times bc + (1 - bc)$$

$$b_i = \frac{c}{z_i^{(new)}}$$

where $\mu$ is the learning rate and bc is the bias time constant with a positive value slightly less than 1. In the exemplary implementation, the learning rate is set to 0.01 and the bias time constant is set to 0.999.

5. Return to step 2 when k is less than the maximum number of iterations, otherwise the training is finished.

In the present invention of the adaptive display window width and center adjustment system, the total number of clusters (n) in the HNN is set to 120 and the number of clusters (m) assigned to each input vector is set to 4.

RBF Networks

Figure 6:
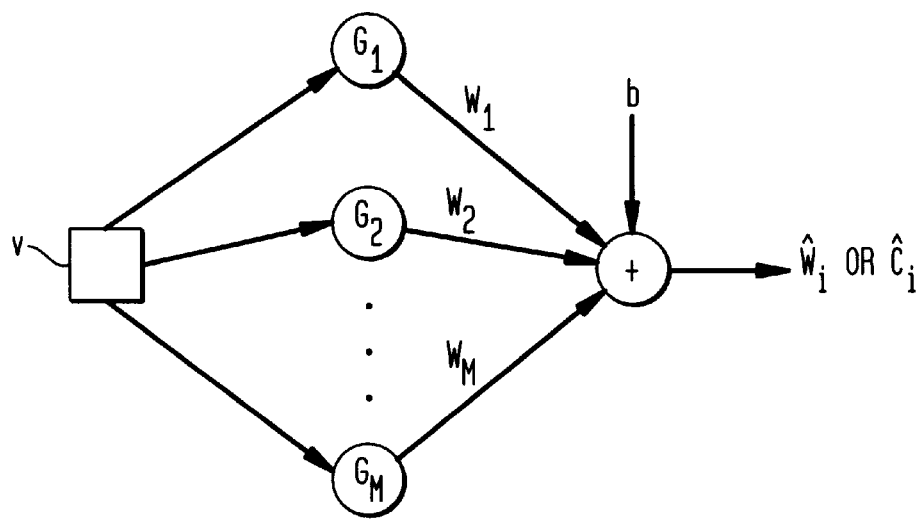
FIG. 6 is a block diagram of the structure of an RBF network for estimation of width or center according to an embodiment of the invention.

The structure of the radial basis function (RBF) networks is shown in FIG. 6. The RBF networks consist of M nodes and a bias b with each node containing a centroid vector $x_j$, a weight $W_j$, and a space constant $\sigma_j$. Note that the space constant is set to the same value $\sigma$ in our system. The output value of an RBF network for an input vector v can be written as $$\sum_{j=1}^{M} W_j e^{\frac{-\|v-x_j\|^2}{\sigma^2}} + b$$

The coefficients $x_j$, $W_j$ and b for each RBF network are computed through a supervised training algorithm. (S. Chen, C. F. N. Cowan, and P. M. Grant, "*Orthogonal least squares learning algorithm for radial basis function networks*", IEEE Trans. Neural Networks, Vol. 2, No. 2, pp. 302–309, 1991). The training data for each class is obtained after the soft clustering of the training data accomplished by the modified competitive layer neural networks. The RBF training is performed in an incremental fashion, i.e. the total number of nodes used in the RBF, M, is added one by one until the RBF networks achieve the error goal of fitting the training data. The centroid vector $x_j$ of each node is selected to be the available feature vector in the training data with the largest fitting error using the existing RBF network. Note that the feature vector is unavailable once it was chosen to be a centroid in the RBF training process. The weights $W_j$ and the bias b are computed by solving the following minimization problem $$\sum_{i=1}^{N} \left( \omega_i \left( d_i - \sum_{j=1}^{M} W_j e^{\frac{-\|v-x_j\|^2}{\sigma^2}} - b \right) \right)^2$$

where ($v_i$, $d_i$) is the i-th feature vector and the corresponding normalized width/center value in the training data for this class, and $\omega_i$ is the weighting associated to the i-th data sample. The solution to this least square problem is equivalent to solve the following linear system $$\begin{bmatrix} \omega_1 & \omega_1 e^{-\|v_1-x_1\|^2/\sigma^2} & \cdots & \omega_1 e^{-\|v-x_M\|^2/\sigma^2} \\ \omega_2 & \omega_2 e^{-\|v_2-x_1\|^2/\sigma^2} & \cdots & \omega_1 e^{-\|v_2-x_M\|^2/\sigma^2} \\ \vdots & \vdots & \vdots & \vdots \\ \omega_N & \omega_N e^{-\|v_N-x_1\|^2/\sigma^2} & \cdots & \omega_N e^{-\|v_N-x_M\|^2/\sigma^2} \end{bmatrix} \begin{bmatrix} b \\ W_1 \\ \vdots \\ W_M \end{bmatrix} = \begin{bmatrix} \omega_1 d_1 \\ \omega_2 d_2 \\ \vdots \\ \omega_N D_N \end{bmatrix}$$

Since we always set the number of nodes M to be less than the total number of data samples for this cluster N, this is an over-constrained linear system and can be robustly solved by the singular value decomposition (SVD) method (See., Chen et al., 1991; and W. H. Press, S. A. Teukolsky, W. T. Vetterling and B. P. Flannery, *Numerical Recipes in C. 2$^{nd}$ Edition*, Cambridge University Press, 1992). The present invention requires the maximum number of nodes used in the RBF training to be less than the number of data samples N and also less than a fixed number, which is set to 40 in the exemplary implementation to provide good generalization power. The weighs $\omega_i$ are used to assign different weighting for different training samples that can be specified in the user interaction process. A larger weight is given for the image sequences that were selected in the user re-adjustment than those not selected to enforce the trained HNN to comply to the new user's window width/center adjustment.

BLE Networks

Figure 7A:
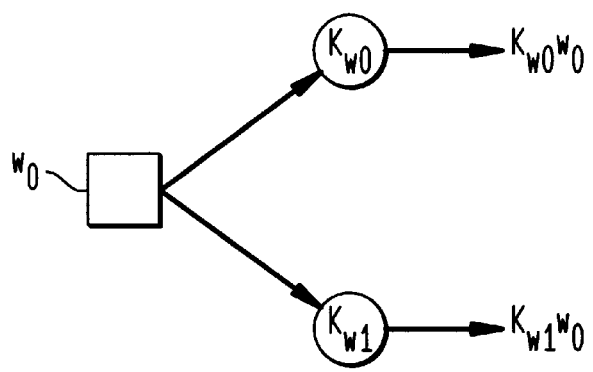
FIG. 7a is a block diagram of the structure of the width bi-modal linear networks according to the invention.
Figure 7B:
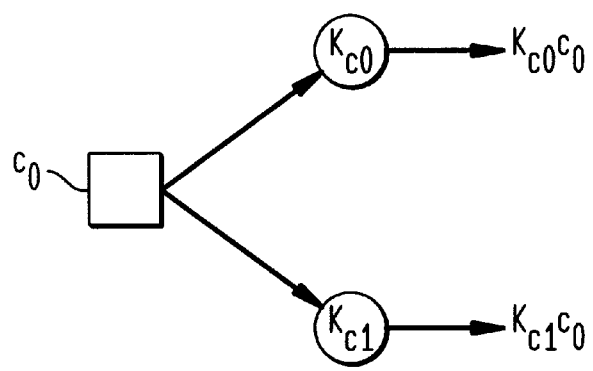
FIG. 7b is a block diagram of the structure of the center bi-modal linear networks according to the invention.

The bi-modal linear estimation (BLE) networks is primarily used to provide the two mean values in the mixture of two Gaussian distributions for the width or center in each cluster, thus supplying a consistency measure for the estimation from the corresponding RBF networks in the same cluster. As shown in FIGS. 7a and 7b, the width and center BLE network contains only two scaling coefficients, $K_{w0}$ and $K_{w1}$ and $K_{c0}$ and $K_{c1}$, respectively, for generating the two mean values. Note that the inputs to the BLE networks are the reference width and center values determined from the image histogram analysis. Similar to the training of the RBF networks, a supervised training procedure for the BLE networks is also emplyed. The training data for each cluster is obtained from the soft clustering of the entire training data set that is accomplished by the modified competitive layer networks. In each cluster, the ratios of the width/center values in the training data to the reference width/center values are divided into two groups with each group representing samples from a Gaussian distribution. Then we can simply compute the sample mean for each group to be the corresponding scaling coefficient. The division into two groups is through a thresholding process with the threshold empirically set to 1.0 for both the width and center BLE networks and for all the clusters.

Implementation Results

In the exemplary implementation of the adaptive window width/center adjustment system of the present invention, a training data set containing a wide variety of 2436 MR images is used. These images were first manually grouped into sequences and then divided into eight categories namely, head, body, heart, spine, neck, periphery, angiography and miscellaneous categories. In each sequence, two representative frames are manually selected roughly from the beginning and the end of the sequence respectively. In the global mapping process, the smoothing splines model the global width/center transformation function. In addition to the boundary conditions at the width/center values of 0 and 4095, the nodes of the spline are non-uniformly chosen at the values of 125, 250, 500, 750, 1000, 1500, 2000 and 3000. The distribution of these nodes is denser in the period of low width/center values and coarser in the period of high width/center values. This selection takes into consideration the higher sensitivity of the global width/center transformation for low width/center values than that for high values. For the sequence mapping, the order of the polynomial for modeling the baseline of the width/center settings in the sequence is set to 0 or 1 depending on the number of representative frames selected in the re-adjustment process.

After the global mapping and sequence mapping processes, the new training data set adapted to the re-adjusted width/center values of some representative images is generated. The HNN is re-trained using this new training data set using previously described training procedures. In the training of the RBF networks, larger weights are assigned to the training samples in the sequences selected for re-adjustment to enforce the HNN training to comply to the user's adjustment. In the exemplary implementation, we assign 6.0 for the weights of the samples in the selected sequences and 1.0 for others. Other weights can be assigned without departing from the scope of this disclosure.

Figure 8A:
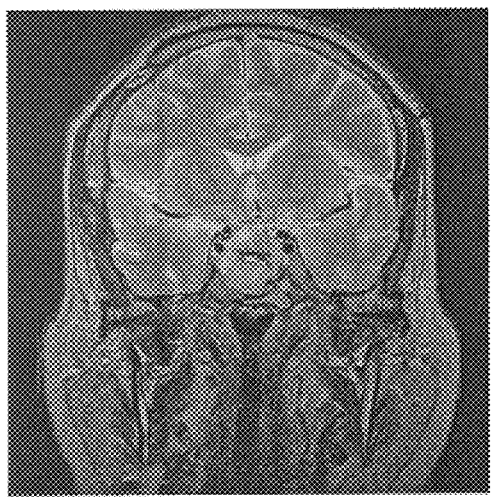
FIG. 8a is an MR image of a head with the original width/center setting (w=1524, c=882) by a human expert.
Figure 8B:
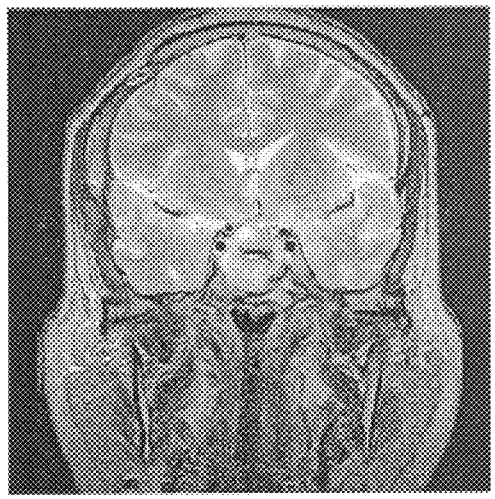
FIG. 8b is an MR image of the head with the newly re-adjusted widtli/center setting (w=1222, c=707)
Figure 8C:
FIG. 8c is an MR image of the head with the original HNN width/center estimate (w=1355, c=737)
Figure 8D:
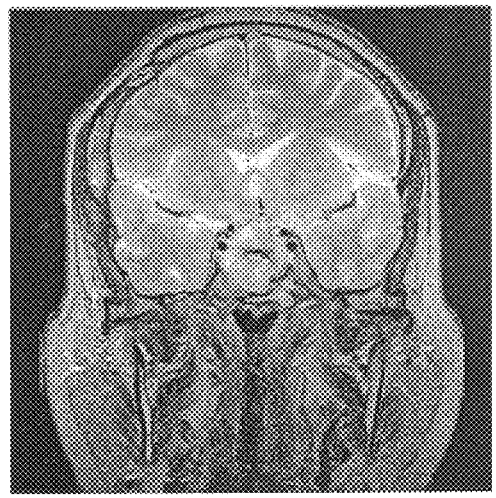
FIG. 8d is an MR image of the head with the newly re-trained HNN width/center estimate (w=1189, c=708)

In the exemplary implementation, 120 clusters are used in the HNN for the entire training data set with each cluster containing the RBF and BLE networks for width and center estimation. Each input vector to the HNN is assigned to 4 clusters and the width/center estimates from these 4 clusters are integrated to provide the final HNN estimation. The total execution time for the width/center mapping process and the HNN re-training takes about 47.54 seconds on a SUN Ultra-SPARC workstation or 276.53 seconds on a SUN SPARC-10 workstation. FIGS. 8a–8d depict a head MR image selected in the re-adjustment process and displayed with different width/center settings. FIG. 8a shows the original width/center setting in the training data set (w=1524, c=882) as made by a human expert. FIG. 8b shows the MR image with the newly re-adjusted width/center setting (w=1222, c=707). FIG. 8c shows the original HNN width/center estimate (w=1355, c=737), and FIG. 8d shows the MR image of the head with the newly re-trained HNN width/center estimate (w=1189, c=708). Thus, it can be seen that the re-trained HNN estimate of FIG. 8d is adapted to the re-adjusted width/center setting shown in FIG. 8b.

Figure 9A:
FIG. 9a is a spine MR image displayed with the original width/center setting (w=718, c=289) by a human expert.
Figure 9B:
FIG. 9b is the spine MR image with the newly re-adjusted width/center setting (w=574, c=231)
Figure 9C:
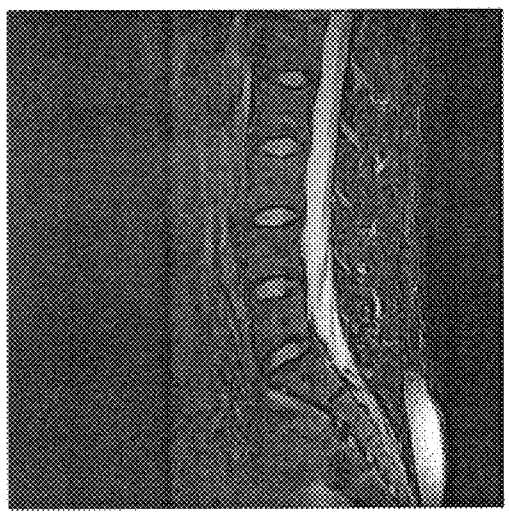
FIG. 9c is the spine MR image of the original HNN width/center estimate (w=758, c=335)
Figure 9D:
FIG. 9d is the spine MR image with the newly re-trained HNN width/center estimate (w=602, c=240).

Another example on a spine MR image is shown in FIG. 9, where FIG. 9a is a spine MR image displayed with the original width/center setting (w=718, c=289) by a human expert. FIG. 9b is the spine MR image with the newly re-adjusted width/center setting (w=574, c=231). FIG. 9c is the spine MR image of the original HNN width/center estimate (w=758, c=335), and FIG. 9d is the spine MR image with the newly re-trained HNN width/center estimate (w=602, c=240).

It should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A method for adjusting display window parameters in displayed Magnetic Resonance (MR) images comprising the steps of:
    organizing a training data set into categories and sequences;
    readjusting by a user window parameters of representative images from each sequence;
    adapting the window parameters of the entire training data set in response to the re-adjusting; and
    re-training hierarchical neural networks with the adapted training data; wherein said step of adapting further comprises the steps of:
    mapping the re-adjusted data through a global mapping function; and
    mapping the globally mapped data through a sequence mapping process;
    wherein said step of mapping through a global mapping function further comprises the step of:
        generating new window parameter values from the original training data set in response to the user's input.

2. The method according to claim 1, further comprising the step of selecting the representative images from each sequence.

3. The method according to claim 1, wherein said step of re-adjusting is performed by a system user to adapt the image data display to the user's preference and the surrounding viewing conditions.

4. The method according to claim 1, wherein said step of mapping the globally mapped data through a sequence mapping process enforces the new window parameter values for all images in the same sequence to comply with the user's input.

5. The method according to claim 1, wherein said window parameters are the width/center setting values of the displayed MR images.

6. An apparatus for adjusting display window parameters of displayed Magnetic Resonance (MR) images comprising:
    means for organizing a first training data set into categories and sequences,
    means for adapting representative images of the sequences to a user's preference and surrounding viewing conditions; and
    means for re-training the first training data set into a second training data set in response to the adaptation of the representative images; wherein said means for adapting comprises:
    a mapper for mapping re-adjusted data through a global mapping function; and
    a global mapper for mapping the globally mapped data through a sequence mapping process; wherein said mapper comprises:
        a generator for generating new window parameter values from the original training data set in response to the user's input.

7. The apparatus according to claim 6, wherein said means for organizing comprises a hierarchical neural network embodied in a general purpose computer.

8. The apparatus according to claim 6, wherein said means for adapting comprises a user interface for receiving user input and enabling the user to re-adjust the display window parameters.

9. A method for adjusting width and center values in displayed Magnetic Resonance (MR) images comprising the steps of:
    organizing a training data set of width and center values of MR images into categories and sequences;
    re-adjusting by a user the width and center values of representative images from each sequence;
    adapting the width and center values of the entire training data set in response to said step of re-adjusting; and
    re-training hierarchical neural networks with the adapted training data;
    wherein said step of adapting further comprises the steps of:
    mapping the re-adjusted data through a global mapping function; and
    mapping the globally mapped data through a sequence mapping process;
    wherein said step of mapping through a global mapping function further comprises the step of:
        generating new window parameter values from the original training data set in response to the user's input.

10. The method according to claim 9, further comprising the step of selecting the representative images from each sequence.

11. The method according to claim 9, wherein said step of re-adjusting is performed by a system user to adapt the image data display to the user's preference and the surrounding viewing conditions.

* * * * *